(12) United States Patent
Ronen et al.

(10) Patent No.: US 10,095,040 B2
(45) Date of Patent: Oct. 9, 2018

(54) LASER DIODE UNIFORM ILLUMINATOR

(71) Applicant: Visionsense Ltd., Petah Tikva (IL)

(72) Inventors: Udi Ronen, Kfar Saba (IL); Nadav Haresh, Ramat Raziel (IL); Alex Chanin, Holland, PA (US); Ofer Braude, Ramat Gan (IL)

(73) Assignee: Visionsense Ltd., Petah Tikva (IL)

( * ) Notice: Subject to any disclaimer, the term of this patent is extended or adjusted under 35 U.S.C. 154(b) by 0 days.

(21) Appl. No.: 14/849,359

(22) Filed: Sep. 9, 2015

(65) Prior Publication Data

US 2016/0085078 A1    Mar. 24, 2016

(30) Foreign Application Priority Data

Sep. 21, 2014 (IL) .......................................... 234766

(51) Int. Cl.
   *G02B 27/00* (2006.01)
   *G02B 27/09* (2006.01)
   (Continued)

(52) U.S. Cl.
   CPC ....... *G02B 27/0927* (2013.01); *G02B 5/0294* (2013.01); *G02B 6/0005* (2013.01);
   (Continued)

(58) Field of Classification Search
   CPC ........... C12M 1/34; C12M 1/42; C12N 13/00; C12N 15/10; C12N 5/06; C12N 5/0087;
   (Continued)

(56) References Cited

U.S. PATENT DOCUMENTS 3,762,801 A * 10/1973 Baker .................... G02B 13/18
                                                              359/716
5,063,781 A * 11/1991 Conforti ................. G01H 9/006
                                                              250/227.29

(Continued)

FOREIGN PATENT DOCUMENTS

EP        1292134          3/2003
EP        1548481 A1       6/2005

(Continued)

OTHER PUBLICATIONS

Voelkel et al. Laser Beam Homogenizing: Limitations and Constraints, SPIE Europe, Optical Systems Design, Sep. 2008.*

(Continued)

*Primary Examiner* — Frank Huang
(74) *Attorney, Agent, or Firm* — Merchant & Gould P.C.

(57) ABSTRACT

A fluorescence imaging system including a light source, an optical system, camera and an excitation light filter, the optical system produces a non-uniform fluence excitation illumination beam for illuminating an object and promoting fluorescence emissions, the optical system is positioned between the light source and the object, the optical system modifies the non-uniform fluence illumination beam into a uniform fluence illumination beam and changes the divergence of the uniform fluence illumination beam, the camera has an array of pixels, the camera detects the fluorescence emissions and performs pixel intensity measurements for each of the pixels, the excitation light filter is positioned between the object and the camera and filters out the excitation illumination beam, such that the excitation illumination beam does not reach the camera.

2 Claims, 5 Drawing Sheets

(51) Int. Cl.
G02B 21/00 (2006.01)
G02B 5/02 (2006.01)
F21V 8/00 (2006.01)
G02B 21/16 (2006.01)
G02B 21/36 (2006.01)
G02B 27/48 (2006.01)
H04N 5/238 (2006.01)

(52) U.S. Cl.
CPC ..... *G02B 21/0032* (2013.01); *G02B 21/0076* (2013.01); *G02B 21/16* (2013.01); *G02B 21/361* (2013.01); *G02B 21/365* (2013.01); *G02B 27/0916* (2013.01); *G02B 27/0922* (2013.01); *G02B 27/48* (2013.01); *H04N 5/238* (2013.01)

(58) Field of Classification Search
CPC .. C12N 5/0093; C12N 15/1034; G01N 33/50; G01N 33/569; G01N 21/6428; G01N 21/645; G01N 21/6456; G01N 33/5005; G01N 33/5091
See application file for complete search history.

(56) References Cited

U.S. PATENT DOCUMENTS

| | | | | |
|---|---|---|---|---|
| 5,212,593 A * | 5/1993 | Williamson | ........... | G02B 13/14 359/485.07 |
| 6,249,381 B1 * | 6/2001 | Suganuma | ........... | G02B 27/123 359/618 |
| 7,268,878 B2 * | 9/2007 | Wolf | ........... | G01J 3/4406 356/417 |
| 8,016,449 B2 * | 9/2011 | Liu | ........... | G02B 5/10 362/97.1 |
| 8,068,899 B2 * | 11/2011 | Llewellyn | ........... | A61B 5/0062 600/478 |
| 8,275,226 B2 * | 9/2012 | Berman | ........... | G02B 21/0032 359/368 |
| 8,289,818 B2 * | 10/2012 | Taratorin | ........... | B82Y 15/00 360/59 |
| 8,294,757 B2 * | 10/2012 | Yu | ........... | C12M 33/04 348/77 |
| 8,294,977 B2 * | 10/2012 | Kirkby | ........... | G01N 21/6458 359/285 |
| 8,297,825 B2 * | 10/2012 | Onishi | ........... | G02B 6/0025 362/607 |
| 8,670,178 B2 * | 3/2014 | Cooper | ........... | G02B 21/0032 359/368 |
| 8,743,923 B2 * | 6/2014 | Geske | ........... | H01S 5/4087 372/108 |
| 8,788,021 B1 * | 7/2014 | Flusberg | ........... | A61B 5/0059 356/318 |
| 2002/0100990 A1 * | 8/2002 | Platt | ........... | A61F 2/1627 264/1.38 |
| 2005/0051723 A1 * | 3/2005 | Neagle | ........... | C12M 41/14 250/306 |
| 2006/0012842 A1 | 1/2006 | Abu-Ageel | | |
| 2007/0020124 A1 * | 1/2007 | Singhal | ........... | F04B 43/043 417/413.2 |
| 2007/0251916 A1 | 11/2007 | Akahane et al. | | |
| 2007/0263226 A1 * | 11/2007 | Kurtz | ........... | A61B 5/0059 356/492 |
| 2010/0118278 A1 | 5/2010 | Kobayashi et al. | | |
| 2010/0170017 A1 * | 7/2010 | Heidmann | ........... | G01R 33/032 850/48 |
| 2010/0206731 A1 * | 8/2010 | Lau | ........... | B03C 5/005 204/547 |
| 2010/0220300 A1 | 9/2010 | Kondo et al. | | |
| 2013/0003343 A1 * | 1/2013 | Sudarshanam | ........ | G02B 27/48 362/19 |

FOREIGN PATENT DOCUMENTS

WO 2009052836 4/2009
WO WO 2011/059383 A1 5/2011

OTHER PUBLICATIONS

Argyle et al. "New laser illumination method for Kerr microscopy", J. Appl. Phys., vol. 87, 6487-6489, 2000.*
"Laser Speckle Reducer LSR-3000 Series", Datasheet LSR-3000 Series, Optotune, 2013, 6 pgs., http://www.optotune.com/images/products/Optotune%20LSR-000%20Series.pdf.
"6W CW 808nm VCSEL Array on submount Part #PCW-CS6-6-W0808", Princeton Optronics, 2014, 2 pgs, http://www.princetonoptronics.com/products/pdfs/PCW-CS6-6-W0808%20revB-0514.pdf.
Voelkel, R. et al., "Laser Beam Homogenizing: Limitations and Constraints", SPIE Europe Optical Systems Design, 2008, 12 pgs.
Extended European Search Report for European Application No. 15185995.6, dated Dec. 11, 2015.
Communication pursuant to Article 94(3) of EPC for Application No. 15 185 995.6-1562, dated Feb. 7, 2017.
Office Action for European Patent Application No. 15185995.6, dated Oct. 5, 2017.

* cited by examiner

LASER DIODE UNIFORM ILLUMINATOR

This application claims benefit of Serial No. 234766, filed 21 Sep. 2014 in Israel and which application is incorporated herein by reference. To the extent appropriate, a claim of priority is made to the above disclosed application.

FIELD OF THE DISCLOSED TECHNIQUE

The disclosed technique relates to laser illumination devices, in general, and to methods and systems for producing uniform illumination for fluorescence imaging by employing a laser diode and a vibrating diffuser, in particular.

BACKGROUND OF THE DISCLOSED TECHNIQUE

Fluorescence imaging is employed for imaging tissues. The fluorescence imager detects fluorescence light emitted from a fluorescence agent that is excited by appropriate illumination. For example, a fluorescent microscope is an imaging system for imaging internal blood flow, visible through the skin, by promoting fluorescence radiation from a fluorescent dye added to the flowing blood. The microscope can be employed, for example, during surgery for visualizing the blood flow, and for evaluating tissue perfusion and vessel patency.

The excitation illumination should be strong (i.e., of high intensity) because the fluorescence signal is often fairly weak, especially when employing IndoCyanine Green (ICG) as the fluorescence agent. One approach to create such an excitation light source is to use a laser diode. A laser diode allows relatively high power to be concentrated in a narrow wavelength region. This is advantageous for exciting fluorescent agents without interfering with the fluorescence image (i.e., as the excitation radiation can be easily filtered out in the camera).

It is noted that the fluence (i.e., output distribution) of a laser diode is Gaussian, with the center of the beam having significantly higher energy than the edges of the beam. Put another way, the fluence of the laser diode beam is non-uniform. This presents a significant problem for fluorescence imaging since fluorescence intensity is generally proportional to excitation light. Any light source that is not uniform will create artificial differences in fluorescence intensity due to non-uniformity of the excitation light. These artificial differences may be misinterpreted as physiological effects by the user of the system viewing the image. Such a misinterpretation may have very significant clinical consequences. Additionally, if image pixel intensity measurements (of any kind) are used, a non-uniform source will produce incorrect measurement results.

When designing laser-based illumination systems, one design requirement is to provide systems that are skin-safe and eye-safe. That is, the output of the illumination system should be within the safety limits for light incident on human skin and on human eyes.

A diffuser that vibrates along its plane is known in the art. Reference is now made to Datasheet: LSR-3000 Series for Laser Speckle Reducer LSR-3000 Series, published on Mar. 10, 2013 at: http://www.optotune.com/images/products/Optotune%20LSR-000%20Series.pdf. LSR Speckle reducer is basically a diffuser that is moved (i.e., vibrated). Speckle noise from a laser-based system is reduced by dynamically diffusing the laser beam. The diffuser is bonded to a thin elastic membrane, which includes four independent electro-active polymer electrodes that induce a circular oscillation of the diffuser in X and Y directions. The oscillation frequency is set to the measured resonant frequency of the LSR speckle reducer during production. However, both voltage and frequency of the electro-active polymer can be controlled.

Semiconductor diode lasers are electrically pumped semiconductor lasers in which the active medium is formed by a p-n junction of a semiconductor diode. Semiconductor diode lasers include several configurations, such as edge-emitter laser diodes and Vertical-Cavity Surface-Emitting Diode Lasers (VCSEL). Edge-emitter laser diodes are made up of bars diced from the wafers on which the diode layers are grown. The high index of refraction contrast between air and the semiconductor material at the side facets of the diced bars act as mirrors. Thus, the light oscillates parallel to the layers and escapes side-ways.

In a VCSEL, the active layer is sandwiched between two highly reflective mirrors (also referred to as distributed Bragg reflectors) composed of several layers of alternating high and low refractive index. The light oscillates perpendicular to the layers and escapes through the top (or bottom) of the device. A VCSEL array is an X-Y array of thousands of laser sources packed into a rectangular illuminator (e.g., 2.8 millimeter×2.8 millimeter). Each individual illuminator in the array is fairly low power (e.g., a few milliwatts). However, taken together the thousands of illuminators make up a powerful illuminator array. VCSEL array products are known in the art, for example, a "6 W CW 808 nm VCSEL Array" by Princeton Optronics (http://www.princetonoptronics.com/products/pdfs/PCW-CS6-6-W0808%20revB-0514.pdf). It is noted that each ray (produced by a single illuminator) in the array has a non-uniform fluence (e.g., Gaussian shaped fluence). Therefore, while the fluence of a beam formed by the multitude of rays is more uniform than that of any of the rays, it still resembles a pin cushion, and cannot be considered as smoothly uniform.

Reference is now made to U.S. Pat. No. 8,016,449 issued to Liu et al., and entitled "Surface Light Emitting Apparatus Emitting Laser Light". This publication relates to a surface light emitting apparatus, which can be employed, for example, as a backlight for a screen. The apparatus includes a laser light source, and an optical element. The surface of the optical element has optical power, and it converts the intensity distribution of the laser beam emitted by the laser light source into a uniform intensity distribution.

Reference is now made to International Patent Application Publication No. WO2011/059383 to Ivarsson et al., and entitled "Optical Sensor System Based on Attenuated Total Reflection and Method of Sensing". This publication relates to an optical sensor system employing surface plasmon resonance (SPR). The system includes a laser light source, an SPR detector and a distribution device. The distribution device is located between the laser light source and the SPR detector. The laser light source can emit IR radiation. The distribution device distributes the laser beam emitted by the laser light source and converts it into a uniform intensity distribution beam. The system determines the dip in the detected spectrum intensity profile (i.e., the location of the low point in the intensity profile).

Reference is now made to an article by Reinhard Voelkel et al., and entitled "Laser Beam Homogenizing: Limitations and Constraints", published at SPIE_7102_19, Optical Design Conf., Laser Beam Homogenizing, Glasgow 2008. This publication relates to laser homogenizing systems. For example, this publication describes a laser homogenizing system employing an array of lenses for converting the intensity distribution of a laser beam into a uniform intensity distribution.

SUMMARY OF THE DISCLOSED TECHNIQUE

It is an object of the disclosed technique to provide a novel method and system for fluorescence imaging, which overcomes the disadvantages of the prior art. In accordance with the disclosed technique, there is thus provided a fluorescence imaging system. The system includes a light source, an optical system, a camera, and an excitation light filter. The light source is configured to produce a non uniform fluence excitation illumination beam having a non uniform beam fluence. The excitation illumination beam illuminates an object for promoting fluorescence emissions. The optical system is optically coupled with the light source and is positioned between the light source and the object. The optical system is configured to modify the non uniform fluence illumination beam into a uniform fluence illumination beam having a uniform beam fluence. The optical system is further configured to change the divergence of the uniform fluence illumination beam. The camera has an array of pixels, and is configured for detecting the fluorescence emissions and for performing pixel intensity measurements for each of the pixels. The excitation light filter is positioned between the object and the camera. The excitation light filter is configured for filtering out the excitation illumination beam, such that the excitation illumination beam does not reach the camera.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a uniform illumination system including a light source and an optical system. The light source produces a non-uniform fluence light beam (having non-uniform beam fluence). The optical system modifies the non-uniform light beam into a uniform fluence light beam having uniform beam fluence (i.e., modifies the light beam to be a top hat light beam, also referred to as a flat top beam).

In accordance with an embodiment of the disclosed technique, the illumination system further includes a vibrating diffuser. The optical system includes an optical fiber transmitting the light beam produced by the light source. The optical system reimages the output of the optical fiber at an intermediate image plane. The vibrating diffuser is located on the intermediate image plane, and is vibrating along two non-parallel axes. The vibrations of the diffuser compensate for any irregularities on the diffuser surface, thereby smoothing spots on the diffused light beam.

In accordance with another embodiment of the disclosed technique, the light source is a VCSEL array producing an array of light rays forming together a non-uniform light beam. The array light source is positioned off the focal plane of the optical system, such that a slight defocus is introduced to the light beam, thereby smoothing the light beam and making it a uniform fluence beam.

Figure 1:
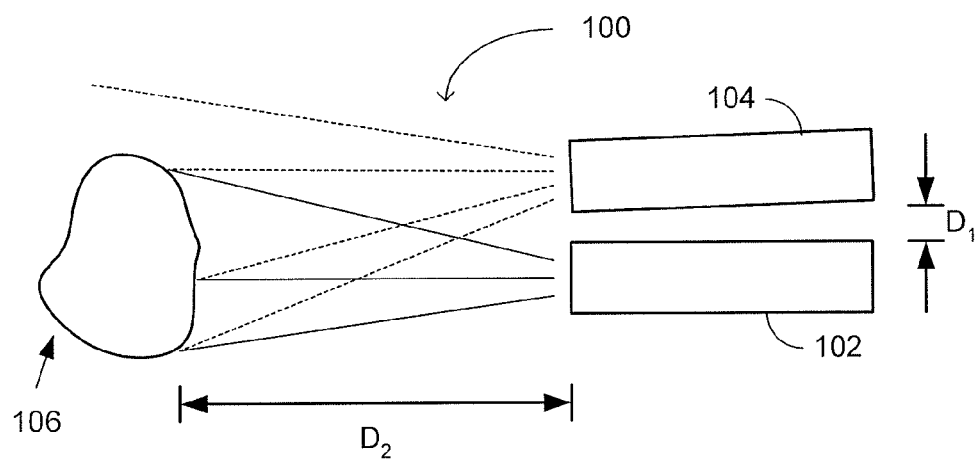
FIG. 1 is a schematic illustration of a fluorescence imaging system, constructed and operative in accordance with an embodiment of the disclosed technique.

Reference is now made to FIG. 1, which is a schematic illustration of a fluorescence imaging system, generally referenced 100, constructed and operative in accordance with an embodiment of the disclosed technique. Fluorescence imaging system 100 includes an image detection system 102 and an illumination system 104. Fluorescence imaging system 100 acquires images of an object 106 located at a distance $D_2$ from the imaging system (e.g., 20-40 Centimeters). Detection system 102 is located at a distance of $D_1$ from illumination system 104.

Detection system 102 detects fluorescent emissions emitted from object 106, and produces accordingly a fluorescent image of object 106. Detection system 102 can further detect a visible image of object 106 by detecting visible light reflected from object 106. The structure and components of detection system 102 are further elaborated herein below with reference to FIG. 2.

Illumination system 104 illuminates object 106. In particular, illumination system 104 provides at least an excitation illumination beam that excites a fluorescent agent in object 106, which emits fluorescent light in response to the excitation light. The excitation illumination beam produced by illumination system 104 should cover the Field of View (FOV) of detection system 102. In other words, an area of object 106 which would not be illuminated with excitation light, would not emit fluorescent light even if it includes a fluorescent agent. Thereby, that area would not be captured in the fluorescent image, which might lead to clinical misinterpretations.

Additionally, the fluence of the illumination beam should be spatially uniform. That is, the excitation light intensity at each location within the FOV of the illumination beam should be substantially similar. The structure and components of illumination system 104 are further elaborated herein below with reference to FIG. 3.

It is noted that illumination system 104 and detection system 102 are not parallel, but are slightly angled toward each other. Thus, the overlap between the FOV of detection system 102 and the FOV of illumination system 104 is increased. In particular, the distance ($D_1$) and the angle, between detection system 102 and illumination system 104 are determined according to the desired object distance ($D_2$), such that the FOV of illumination system 104 would cover that of detection system 102.

Figure 2:
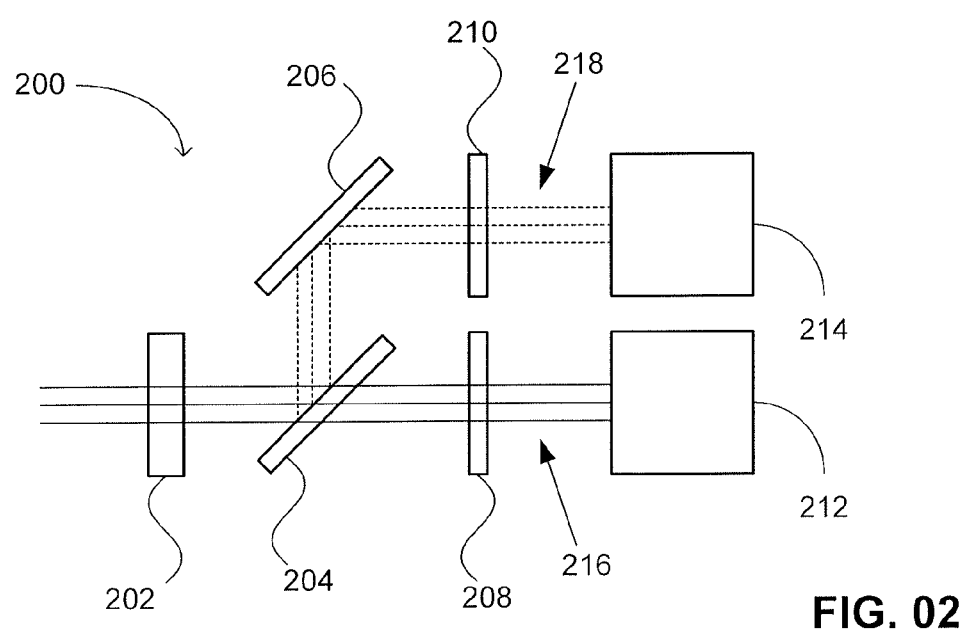
FIG. 2 is a schematic illustration of a fluorescence image detection system, constructed and operative in accordance with another embodiment of the disclosed technique.

Reference is now made to FIG. 2, which is a schematic illustration of a fluorescence image detection system, generally referenced 200, constructed and operative in accordance with another embodiment of the disclosed technique. Detection system 200 includes an excitation light filter 202, a dichroic mirror 204, a mirror 206, a short pass filter 208, a long pass filter 210, a visible light camera 212 and an IR light camera 214.

Excitation light filter 202 is located on the object side of dichroic mirror 204 and is optically coupled therewith. Dichroic mirror 204 is further optically coupled with a visible light camera 212 via short pass filter 208, and with IR camera 214 via mirror 206 and long pass filter 210.

Excitation light filter 202 blocks (or at least attenuates) reflected excitation light, and admits fluorescence light 218 and reflected visible light 216 into detection system 200. It is noted that reflected visible light 216 is either reflected ambient light (i.e., preexisting light in the surroundings of the microscope), or is light provided from a dedicated light source other than the excitation light source. Dichroic mirror 204 reflects IR light 218 (i.e., the fluorescence emissions light) while enabling visible light 216 (i.e., the reflected visible light) to pass therethrough. Visible camera 212 detects a visible image of the object (e.g., object 106 of FIG. 1), while IR camera 214 detects the fluorescence image of the object.

Figure 3:
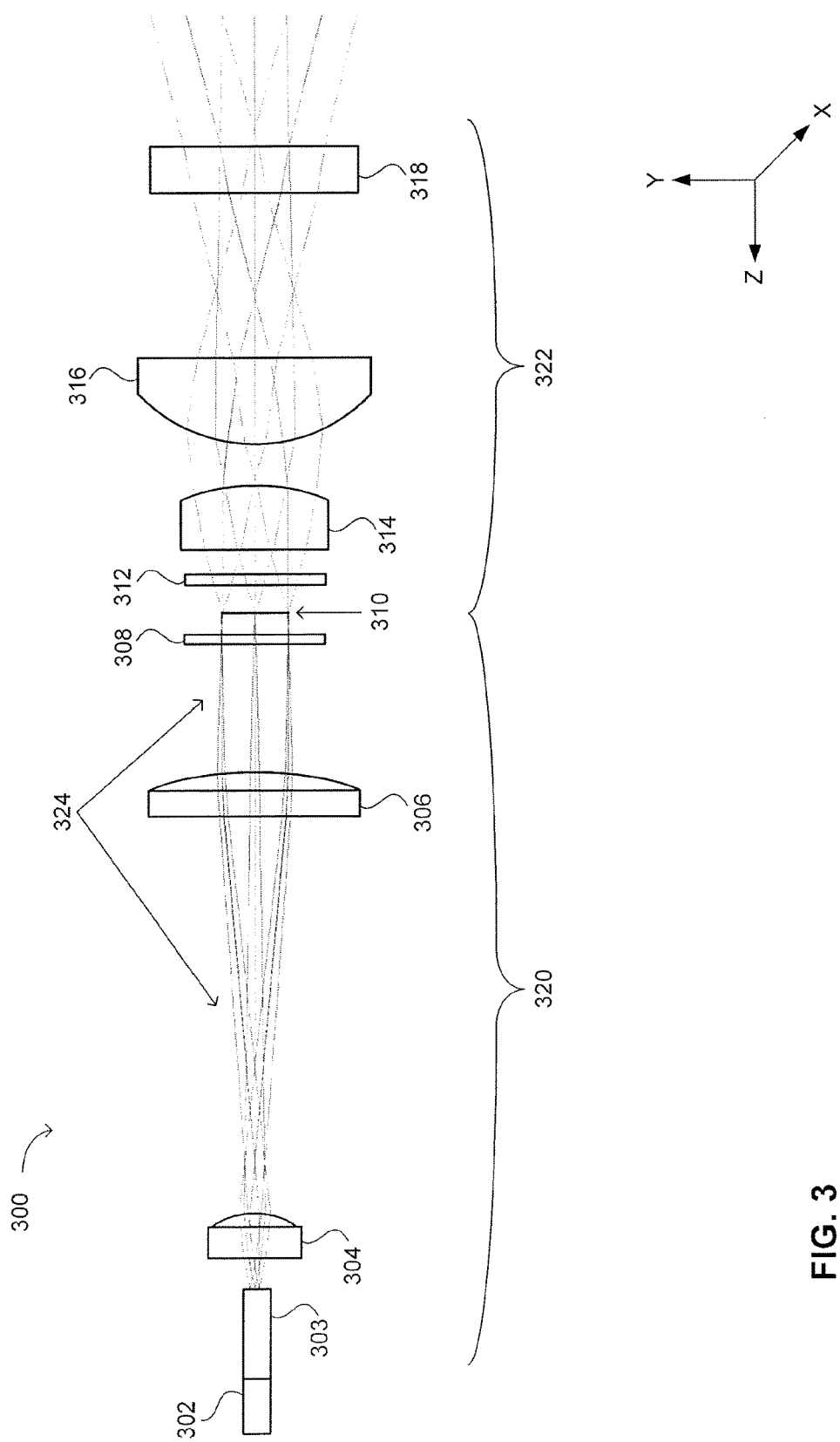
FIG. 3 is a schematic illustration of a uniform illumination system, constructed and operative in accordance with a further embodiment of the disclosed technique.

Reference is now made to FIG. 3, which is a schematic illustration of a uniform illumination system, generally referenced 300, constructed and operative in accordance with a further embodiment of the disclosed technique. Uniform illumination system 300 includes a point light source 302, an optical fiber 303, a first aspheric lens 304, a field lens 306, a pre-diffuser window 308, a vibrating diffuser 310, a post-diffuser window 312, a second aspheric lens 314, a third aspheric lens 316, and an output window 318.

Point light source 302 can be, for example, a laser diode light source, or another laser light source. Generally speaking, point light source 302 can be any point light source providing excitation illumination adapted to excite the fluorescence agent, or otherwise to promote fluorescent emissions to be detected. It is noted that the output distribution (i.e., fluence) of point light source 302 is non-uniform. For example, for an edge-emitter laser diode light source, the fluence is Gaussian shaped with the center of the beam having significantly higher energy than the edges of the beam.

For acquiring fluorescence images, the FOV of an illumination beam 324 (i.e., the beam diameter at the imaged area) should cover at least the FOV of the fluorescence image detector (e.g., detection system 102 of FIG. 1, or detection system 200 of FIG. 2). Furthermore, the fluence of illumination beam 324 should be distributed substantially evenly (i.e. uniformly) across the FOV. Otherwise, for example in the case of Gaussian fluence, the fluorescent emissions at the center of the imaged area would be much stronger than those at the edges of the imaged area, thereby producing an erroneous image that may lead to clinical misinterpretation.

Optical fiber 303 is an optical fiber for transmitting the light produced by light source 302 toward lens 304. For example, fiber 303 can be a 400 micrometer diameter fiber having a numerical aperture of 0.22. Alternatively fiber 303 can be of other dimensions to adapt to the dimensions of light source 302 and those of lens 304. Fiber 303 receives illumination beam 324 at the output of light source 302. The output port of fiber 303 (not referenced) is positioned next to lens 304.

Each of first aspheric lens 304, field lens 306, second aspheric lens 314 and third aspheric lens 316 is a converging lens having positive optical power. Lenses 304 and 306 reimage the output of fiber 303 onto an intermediate image plane on which the surface of diffuser 310 is positioned. Fiber 303 and lenses 304 and 306 flatten the output of light source 302. In other words, fiber 303 and lenses 304 and 306 turn the non-uniform fluence of beam 324 at the output of light source 302 into substantially uniform fluence when beam 324 arrives at diffuser 310.

Lenses 314 and 316 expand the output of diffuser 310 to an angle required for the FOV of the fluorescence system. In other words, lenses 314 and 316 increase the divergence of beam 324. It is noted that as lenses 314 and 316 are converging lenses, the lenses converge the illumination beam toward the focal point thereof, and the beam divergence is increase only after passing the focal point. Therefore, the illumination system is placed well away from the focal point of lens 316. Windows 308 and 312 protect the diffuser surface, and window 318 protects the output of the illumination system 300.

Vibrating diffuser 310 is a planar diffuser that is vibrated in two perpendicular axes along its plane (i.e., vibrated along the X axis and the Y axis of FIG. 3). Diffuser 310 might have surface irregularities that might produce respective irregularities in the fluence of beam 324. Any irregularities in the output beam will translate to artificial variations in the intensity of areas of the fluorescence image and may lead to clinical misinterpretations. The vibrations of diffuser 310 smooth the diffused beam at the output of diffuser 310, thereby eliminating fluence irregularities caused by possible surface irregularities of diffuser 310. In particular, the frequency of vibrations of vibrating diffuser 310 exceeds the frame rate of the camera, thereby compensating for structural irregularities of the diffuser surface and smoothing the illumination beam. In other words, the diffuser face is imaged as part of the illumination optics functionality and any microstructures on the face will show up in the output beam profile. Diffuser vibrations in two non-parallel axes eliminate the effect of microstructures on the diffuser.

Diffuser 310 also improves the safety of the illumination system, by diffusing the narrowly concentrated light emitted from point light source 302. When designing laser-based illumination systems, one design requirement is to provide systems that are skin-safe and eye-safe. That is, the output of the illumination system should be within the safety limits for light incident on human skin and on human eyes. A standard laser diode is generally considered a point source. For a point source illuminator, skin safety and eye safety limits are much lower than for a diffused source. This is because a point source can be focused (by the lens of the eye for example) onto a very small area and can therefore cause thermal damage to the area. As such, a diffusion mechanism is highly desirable with laser diodes to convert the illuminator from a point source to a safer diffused source.

A vibrator (not shown) vibrates diffuser 310. As mentioned above, vibrating diffuser 310 is vibrated in two non-parallel axes (e.g., perpendicular axes X and Y). The frequency and the amplitude of vibrations in each of the axes can be controlled.

In accordance with an alternative embodiment of the disclosed technique, diffuser 310 can be composed of several diffusers. For example, a first diffuser vibrating along the X axis and positioned at a first intermediate image plane of the output of the light source, and a second diffuser vibrating along the Y axis and positioned at a second intermediate image plane of the output of the light source.

In accordance with yet another alternative embodiment of the disclosed technique, the diffuser can be non-planar (e.g., dome shaped or an aspheric diffuser). Thereby, the shape of the diffuser can be employed to disperse the illumination beam evenly across its FOV.

As can be seen in FIG. 3 illumination system 300 includes a light source (point light source 302) and an optical system (i.e., fiber 303 and lenses 304, 306 314 and 316). Specifically, the optical system of uniform illumination system 300 is formed of two optical subsystems, a first subsystem 320 includes fiber 303, first aspheric lens 304 and field lens 306. Fiber 303 receives the non-uniform illumination beam produced by light source 302 and relays it toward lens 304. First optical subsystem 320 is a double telecentric system re-imaging an intermediate image of the output of fiber 303 on the plane of vibrating diffuser 310. That is, diffuser 310 is positioned on a plane of an intermediate image of the output of fiber 303 for diffusing the illumination light beam. At the output of subsystem 320 (i.e., after diffuser 310) the illumination beam is substantially a top hat beam having substantially uniform fluence. In other words, first optical subsystem 320 is configured to transform the fluence of beam 324 from a non-uniform fluence at the output of light source 302 to a uniform fluence at the input to diffuser 310. That is, first optical subsystem 320 is composed of optical elements that are constructed and located so as to flatten the fluence of beam 324.

Second optical subsystem 322 includes second and third aspheric lenses 314 and 316. Subsystem 322 reimages a second image plane of the output of the light source onto a working plane (e.g., an open surgery area to be fluorescently imaged). The illumination beam at the second image plane remains a top hat beam (as is the beam at the output of diffuser 310). Second optical subsystem 322 increases the divergence of light beam 324 to match the required field of view of the system.

It is noted that the optical system described herein above with reference to FIG. 3 is an example optical system and can be replaced by other optical systems having different components. The optical system is designed to modify the illumination beam fluence to become substantially uniform, thereby producing a uniform top hat beam. Additionally, the optical system increases the beam diameter of beam 324 at the imaged area. The optical system of the uniform illumination system reimages the output of the fiber at an intermediate image plane, at which the vibrating diffuser would be located. The diffuser diffuses the light beam.

Figure 4:
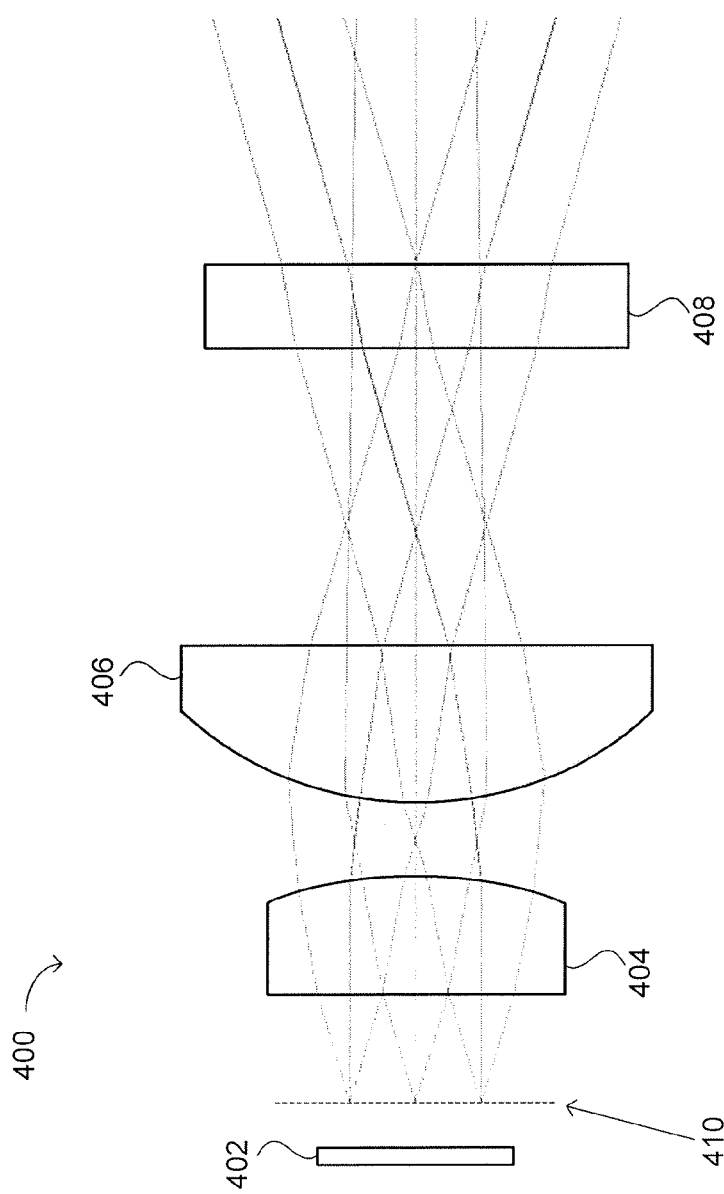
FIG. 4 is a schematic illustration of a uniform illumination system, constructed and operative in accordance with yet another embodiment of the disclosed technique.

Reference is now made to FIG. 4 which is a schematic illustration of an illumination system, generally referenced 400, constructed and operative in accordance with yet another embodiment of the disclosed technique. Uniform illumination system 400 includes a Vertical-Cavity Surface-Emitting Laser (VCSEL) array light source 402, a first aspheric lens 404, a second aspheric lens 406, and an output window 408.

VCSEL array light source 402 provides excitation illumination adapted to excite the fluorescence agent, or otherwise to promote fluorescent emissions to be detected. VCSEL array light source 402 produces uniform output (i.e., producing a top hat beam having uniform fluence). Specifically, while each of the thousands of illuminators in the VCSEL array of light source 402 has a Gaussian beam profile, the illuminators placed in close proximity to each other and added together produce a uniform output. Additionally, the output of VCSEL array light source 402 is much larger (e.g.: 2.8 milimeter×2.8 milimeter) than that of a point source making it easier for the system to be skin-safe and eye-safe.

Each of first aspheric lens 404 and second aspheric lens 406 is a converging lens having positive optical power. Lenses 404 and 406 expand the output of light source 402 (i.e., increase the divergence of the light beam) to an angle required for illuminating the FOV of the fluorescence system. Window 408 protects the output of illumination system 400. It is noted that the optical design of system 400, including lenses 404 and 406, and window 408, is similar to subsystem 322 of FIG. 3. Specifically, in accordance with the embodiment of the disclosed technique presented in FIG. 4, subsystem 320 of FIG. 3, is replaced by VCSEL array light source 402, while subsystem 322 (directed at expanding the excitation illumination beam) remains similar.

VCSEL array light source 402 is placed at some distance in front of an entry focal plane 410 of the optical system (lenses 404 and 406) of illumination system 400, to affect a desired degree of uniformity. In other words, by placing light source 402 off the focus plane of lens 404 a slight defocus (blur) is introduced to the array output. The amount of defocus can be adjusted as needed by changing the distance between the light source 402 and lens 404 while viewing the system illumination pattern.

As mentioned in the background section VCSEL array light source 402 actually produces an array of rays, each having a Gaussian output distribution. By introducing some defocus (by placing the light source off the focus plane of the optical system), the multitude of rays are merged for forming together a smoothed uniform beam. Essentially, the de-focused output of VCSEL array 402 is similar to the output of vibrating diffuser 310 of FIG. 3. That is, the illumination system produces a uniform fluence light beam having uniform flat top fluence, and being skin-safe and eye-safe (within safety levels defined by applicable standards).

As can be seen in FIG. 4, the illumination system includes a light source (i.e., VCSEL array light source 402) and an optical system (i.e., lenses 404 and 406). The light source produces a non-uniform light beam. The optical system modifies the non-uniform light beam into a uniform light beam having uniform flat top fluence.

Figure 5A:
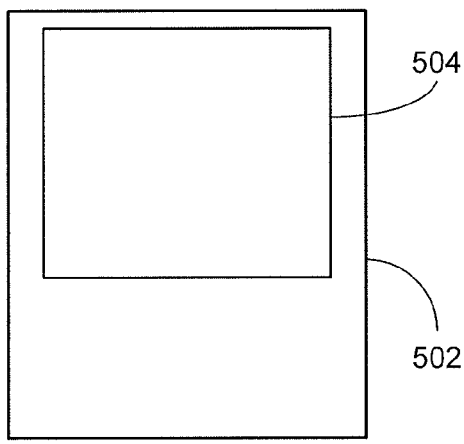
FIGS. 5A, 5B and 5C are schematic illustrations of the FOV of an illumination system and a detection system of a fluorescence imaging system, operative in accordance with yet a further embodiment of the disclosed technique.
Figure 5B:
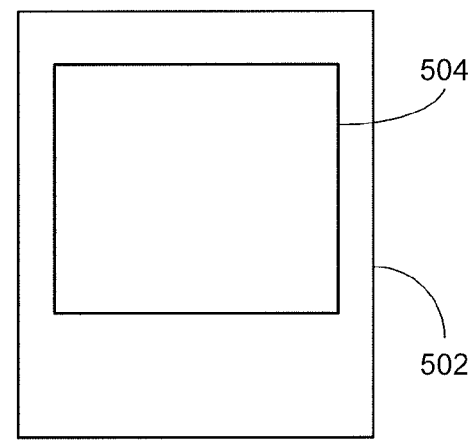
Figure 5C:
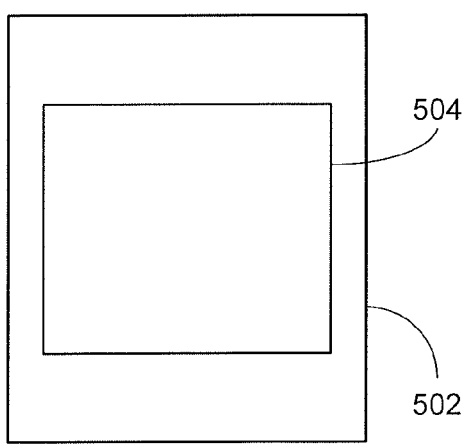

Reference is now made to FIGS. 5A, 5B and 5C which are schematic illustrations of the FOV of an illumination system and a detection system of a fluorescence imaging system, operative in accordance with yet a further embodiment of the disclosed technique. With reference to FIG. 5A, FOV 502 of an illumination system and FOV 504 of a detection system are depicted for an object distance of 20 centimeters (i.e., the object is located 20 centimeters from the illumination and detection systems). With reference to FIG. 5B, FOV 502 of the illumination system and FOV 504 of the detection system are depicted for an object distance of 30 cm. With reference to FIG. 5C, FOV 502 of the illumination system and FOV 504 of the detection system are depicted for an object distance of 40 centimeters.

As can be seen in FIGS. 5A-5C, FOV 502 of the illumination system is larger than FOV 504 of the detection system, for fully illuminating the imaged object. At a relatively short object distance (e.g., 20 centimeters as in FIG. 5A), the FOVs of the illumination system and the detection system are at an offset to each other. This occurs because the systems are located adjacently to one another and not coaxially. At a relative longer distance (40 cm as depicted in FIG. 5C), the distance between the systems is small with respect to the object distance and the FOVs appear substantially concentric.

Figure 6:
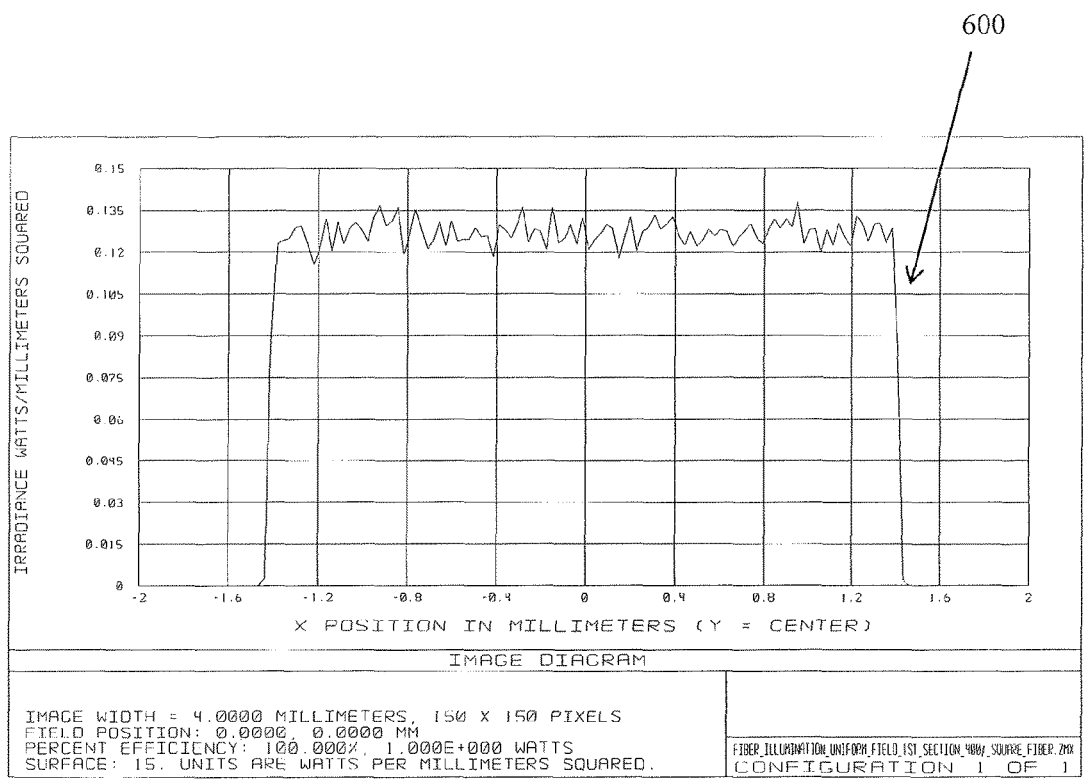
FIG. 6 is an illustration of an output distribution across one axis of an illumination beam, operative in accordance with yet another embodiment of the disclosed technique.

Reference is now made to FIG. 6, which is an illustration of an output distribution, generally referenced 600, across one axis of an illumination beam, operative in accordance with yet another embodiment of the disclosed technique. As can be seen, output distribution 600 is substantially of a top hat shape. That is, the fluence of the illumination beam is dispersed evenly across its FOV. As mentioned above, for example with reference to FIG. 3, the optical system that reimages the output of the light source at an intermediate image plane (at which the diffuser is located) is configured to transform the light beam outputted by the light source into a uniform fluence light beam as depicted in FIG. 6.

It is noted that the imaging system described herein above with reference to FIG. 2, serves only as an example of a fluorescence imaging system, which employs the illumination system of the disclosed technique. Generally, the illumination system of the disclosed technique can be employed for any fluorescence imaging system having a non-uniform fluorescence light source. Moreover, in the examples set forth herein above, the uniform illumination system is employed for producing uniform excitation illumination beam for a fluorescence imaging system. It is noted however, that the uniform illumination system can be employed for other situations in which the light source output is non-uniform and its fluence should be made uniform and smooth. For example, microscope or endoscope imaging systems may also benefit from a uniform high power illumination source as described in this invention. In fact, any system that is intended to perform measurements of output intensity of image pixels will benefit from this type of illumination source.

It will be appreciated by persons skilled in the art that the disclosed technique is not limited to what has been particularly shown and described hereinabove. Rather the scope of the disclosed technique is defined only by the claims, which follow.

The invention claimed is:

1. A fluorescence imaging system comprising:
    a light source configured to produce a non-uniform fluence excitation illumination beam having a non-uniform beam fluence, said excitation illumination beam illuminating an object and configured for promoting fluorescence emissions;
    an optical system optically coupled with said light source and positioned between said light source and said object, said optical system configured to modify said non-uniform fluence illumination beam into a uniform fluence illumination beam having a uniform beam fluence, said optical system configured to change the divergence of said uniform fluence illumination beam;
    a vibrating diffuser;
    a camera having an array of pixels, said camera being configured for detecting said fluorescence emissions and for performing pixel intensity measurements for each of said pixels; and
    an excitation light filter positioned between said object and said camera, said excitation light filter configured for filtering out said excitation illumination beam, such that said excitation illumination beam does not reach said camera;
    wherein said optical system comprises an optical fiber configured to receive said non-uniform fluence illumination beam from said light source, said optical system being further configured to reimage an output of said optical fiber onto an intermediate image plane as said uniform fluence illumination beam;
    wherein said vibrating diffuser is located at said intermediate image plane and configured to vibrate along two non-parallel axes for modifying said non-uniform fluence illumination beam into said uniform fluence illumination beam having said uniform beam fluence; and
    wherein a frequency of vibrations and an amplitude of vibrations of said vibrating diffuser are controlled in each of said two non-parallel axes such that irregularities on a surface of said vibrating diffuser are compensated for, thereby smoothing said excitation illumination beam into said uniform fluence illumination beam and providing substantial improvements in beam fluence uniformity over a vibrating diffuser vibrated along one axis.

2. The fluorescence imaging system of claim 1, wherein said frequency of vibrations of said vibrating diffuser exceeds a frame rate of an image detector for detecting a fluorescence image of said object illuminated by said imaging system.

* * * * *